United States Patent
Heichelbech et al.

(10) Patent No.: US 12,444,248 B2
(45) Date of Patent: Oct. 14, 2025

(54) SYSTEMS AND METHODS FOR MANAGEMENT OF EXHAUST AFTERTREATMENT SYSTEMS USING PREDICTIVE ANALYTICS

(71) Applicant: Cummins Inc., Columbus, IN (US)

(72) Inventors: John K. Heichelbech, Columbus, IN (US); J. Steven Kolhouse, Columbus, IN (US); Shuai Sun, Beijing (CN); Di Wang, Columbus, IN (US); Kai Wang, Columbus, IN (US); Yujun Wang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 16 days.

(21) Appl. No.: 18/020,884

(22) PCT Filed: Aug. 11, 2021

(86) PCT No.: PCT/US2021/045497
§ 371 (c)(1),
(2) Date: Feb. 10, 2023

(87) PCT Pub. No.: WO2022/035936
PCT Pub. Date: Feb. 17, 2022

(65) Prior Publication Data
US 2023/0326264 A1    Oct. 12, 2023

Related U.S. Application Data

(60) Provisional application No. 63/064,504, filed on Aug. 12, 2020.

(51) Int. Cl.
G07C 5/08          (2006.01)
G06Q 10/0631       (2023.01)
G06Q 50/40         (2024.01)

(52) U.S. Cl.
CPC .................................. *G07C 5/0808* (2013.01)

(58) Field of Classification Search
CPC ................. G07C 5/0808; G06Q 50/40; G06Q 10/06311; Y02A 50/20; Y02T 10/12
(Continued)

(56) References Cited

U.S. PATENT DOCUMENTS 6,484,496 B2   11/2002   Tallec et al.
8,914,184 B2   12/2014   Mcquade et al.
(Continued)

OTHER PUBLICATIONS

Hopka et al. "Smart DPF Regenerations—A Case Study of a Connected Powertrain Function", SAE International, Apr. 2, 2019, 9 pages.
(Continued)

*Primary Examiner* — Tyler D Paige
(74) *Attorney, Agent, or Firm* — Foley & Lardner LLP

(57) ABSTRACT

Systems and apparatuses include a controller including at least one processor coupled to a memory storing instructions that, when executed by the at least one processor, causes the at least one processor to: receive data indicative of at least one of a current route or of a current performance of a vehicle; correlate at least one of the current route or the current performance to a control strategy; and determine at least one of a timing or a duration of an active regeneration event for an aftertreatment system based on the correlated control strategy.

20 Claims, 5 Drawing Sheets

(58) Field of Classification Search
USPC .................................................. 701/31.4
See application file for complete search history.

(56) References Cited

U.S. PATENT DOCUMENTS

| | | | |
|---|---|---|---|
| 9,328,644 B2 | 5/2016 | Cui et al. | |
| 9,732,646 B2 | 8/2017 | Upadhyay et al. | |
| 9,896,089 B2 | 2/2018 | Styles et al. | |
| 10,082,095 B2 | 9/2018 | Han | |
| 10,302,034 B2 | 5/2019 | Kidd et al. | |
| 10,309,793 B2 | 6/2019 | Upadhyay et al. | |
| 10,353,691 B2 | 7/2019 | Richter et al. | |
| 11,181,026 B1* | 11/2021 | Webb | F01N 9/00 |
| 11,428,133 B2* | 8/2022 | Light-Holets | F02D 41/1446 |
| 11,603,113 B2* | 3/2023 | Borhan | B60W 50/14 |
| 2005/0166580 A1 | 8/2005 | Pfaeffle et al. | |
| 2006/0064232 A1 | 3/2006 | Ampunan et al. | |
| 2009/0306850 A1 | 12/2009 | Lee et al. | |
| 2010/0204882 A1 | 8/2010 | Giovaresco et al. | |
| 2011/0088374 A1 | 4/2011 | Johnson | |
| 2012/0167555 A1 | 7/2012 | Frazier | |
| 2012/0216509 A1 | 8/2012 | Sujan et al. | |
| 2014/0074386 A1 | 3/2014 | Mcgee et al. | |
| 2014/0081563 A1 | 3/2014 | Wang et al. | |
| 2016/0131069 A1 | 5/2016 | Wackerle et al. | |
| 2016/0201532 A1 | 7/2016 | Chanko et al. | |
| 2016/0201534 A1* | 7/2016 | Lambert | F01N 3/035 |
| | | | 60/274 |
| 2017/0067384 A1 | 3/2017 | Müller | |
| 2017/0089274 A1* | 3/2017 | Kolhouse | F02D 11/105 |
| 2017/0168466 A1* | 6/2017 | Sun | G05B 13/048 |
| 2017/0211456 A1* | 7/2017 | Springer | F01N 3/2013 |
| 2018/0142593 A1* | 5/2018 | Wang | F01N 13/0093 |
| 2019/0003365 A1 | 1/2019 | Dhanraj | |
| 2019/0136775 A1* | 5/2019 | Dudar | B60W 10/08 |
| 2019/0360415 A1 | 11/2019 | Romanato | |
| 2020/0049094 A1* | 2/2020 | Charbonnel | F02D 41/2432 |
| 2020/0156658 A1* | 5/2020 | Borhan | G01C 21/3492 |
| 2021/0381419 A1* | 12/2021 | King | G07C 5/008 |

OTHER PUBLICATIONS

International Search Report and Written Opinion for International Application No. PCT/US2021/045497 mailing date Jan. 20, 2022, 11 pages.

Johnson, Tim. "Diesel Emission Control Technology Review", Corning, DEER 2006, Detroit, Aug. 22, 2006, 40 pages.

Johnson, Timothy. "Vehicular Emissions in Review", SAE International, Apr. 16, 2012, 19 pages.

China 1st Office Action dtd Jun. 25, 2025 re CN Appl 2025062500341250.

* cited by examiner

SYSTEMS AND METHODS FOR MANAGEMENT OF EXHAUST AFTERTREATMENT SYSTEMS USING PREDICTIVE ANALYTICS

CROSS-REFERENCE TO RELATED APPLICATION

This application claims the benefit of and priority to U.S. Pat. App. No. 63/064,504 titled "SYSTEMS AND METHODS FOR MANAGEMENT OF EXHAUST AFTERTREATMENT SYSTEM USING PREDICTIVE ANALYTICS," filed Aug. 12, 2020, which is incorporated herein by reference in its entirety and for all purposes.

TECHNICAL FIELD

The present disclosure relates to management of components within an exhaust aftertreatment system.

BACKGROUND

Exhaust aftertreatment systems are generally designed to reduce emissions of particulate matter, nitrogen oxides (NOX), hydrocarbons, and other environmentally harmful pollutants. However, as the systems treat exhaust in order to reduce these environmentally harmful pollutants, deposits can form throughout the aftertreatment system. These deposits are formed by operation of the filter elements and/or by leftover byproducts of the reduction process. As these deposits form, efficacy and efficiency of the aftertreatment system can be adversely affected. Therefore, regular removal of these deposits is beneficial to maintaining aftertreatment system performance. However, these removal events, which are referred to as regeneration events, can interfere with normal engine operation and require additional resources to actuate.

SUMMARY

One embodiment relates to a system that includes a controller including at least one processor coupled to a memory storing instructions that, when executed by the at least one processor, causes the at least one processor to receive data indicative of at least one of a current route or of a current performance of a vehicle, correlate at least one of the current route or the current performance to a control strategy, and determine at least one of a timing or a duration of an active regeneration event for an aftertreatment system based on the correlated control strategy.

Another embodiment relates to a method for managing components of an aftertreatment system. The method includes receiving, by a controller, data indicative of at least one of a current route or of a current performance of a vehicle, correlating, by the controller, at least one of the current route or the current performance to a control strategy, and determining, by the controller, at least one of a timing or a duration of an active regeneration event for an aftertreatment system based on the correlated control strategy.

Another embodiment relates to a system that includes a controller including at least one processor coupled to a memory storing instructions that, when executed by the at least one processor, cause the at least one processor to receive data indicative of at least one of a current route or of a current performance of a vehicle, correlate at least one of the current route or the current performance to a control strategy, and alter at least one of a timing or a duration of a passive regeneration event for an aftertreatment system based on the correlated control strategy using at least one of a heater or a cylinder deactivation (CDA) system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
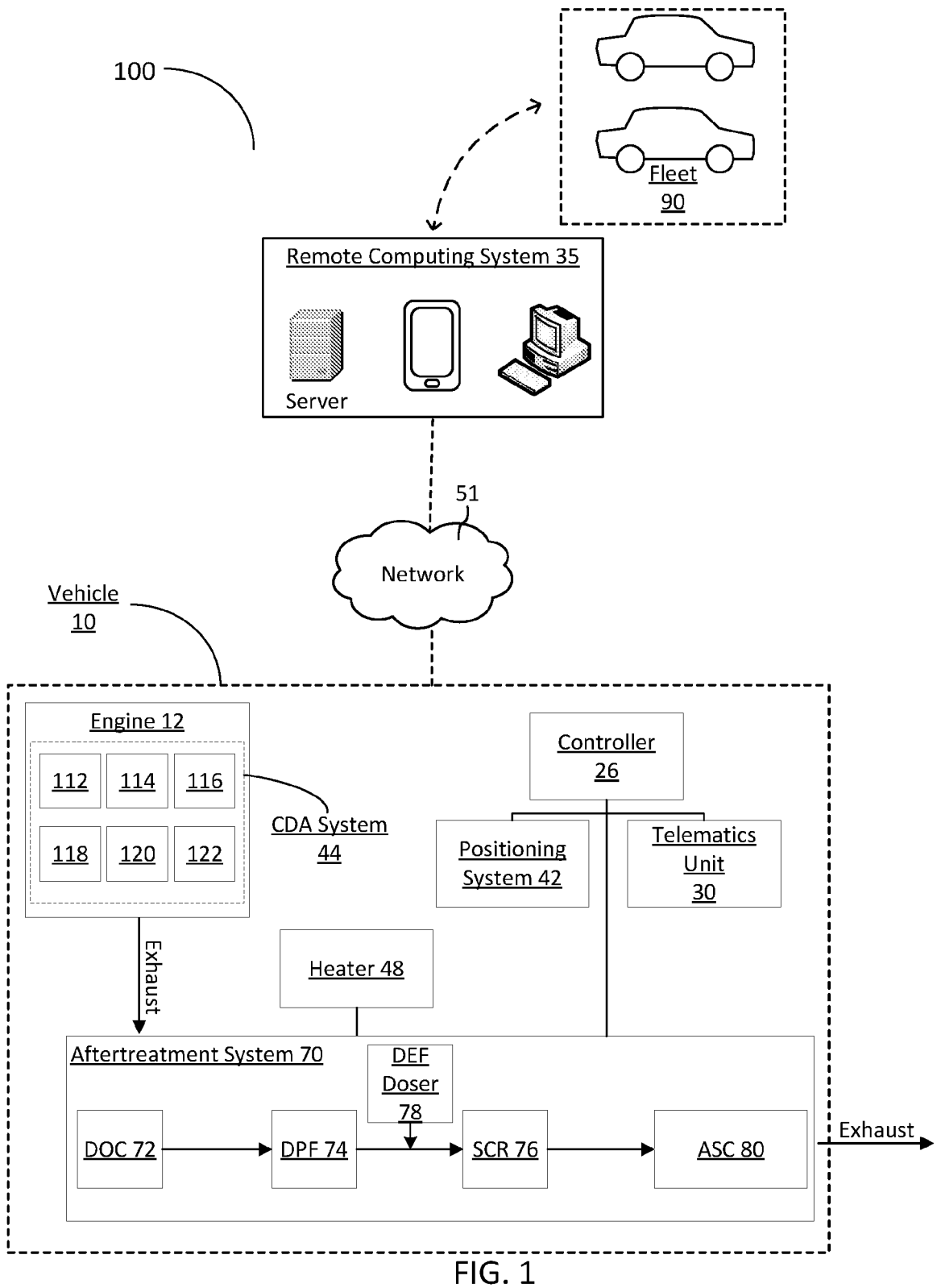
FIG. 1 is a schematic diagram of a vehicle, according to an example embodiment.

Following below are more detailed descriptions of various concepts related to, and implementations of, methods, apparatuses, and systems for managing exhaust aftertreatment system using predictive analytics. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. For instance, as used within, "optimal" should also be construed as including "nearly optimal" or "substantially optimal."

Referring to the Figures generally, the various embodiments disclosed herein relate to systems, apparatuses, and methods for managing an exhaust aftertreatment system using predictive analytics. Exhaust aftertreatment systems generally are structured to receive exhaust gas from an engine and clean the exhaust gas before it is released into the atmosphere. However, as the various components of the exhaust aftertreatment system treat the exhaust gas, various particulates such as soot or sulfur from, e.g., incomplete combustion can build up on the components, which require regeneration in order to continue treating the exhaust gas at a desired efficiency rate. This regeneration process often involves heating the exhaust gas or component(s) in the system to a higher temperature to burn the particulates off of the exhaust aftertreatment system components. While this regeneration is typically performed when the engine is taken off-duty (e.g., a service bay, in a parked non-mobile state, etc.), it is possible that the exhaust gas can reach sufficient regeneration temperature through normal operation. According to the present disclosure, a controller includes at least one processor coupled to a memory storing instructions that, when executed by the at least one processor, causes the at least one processor to receive data indicative of a current route of a vehicle, correlate the current route to a stored route based on the data indicative of the current route, determine that an amount of a deposit in an aftertreatment system is exceeding a first threshold, determine whether a passive regeneration event will occur along the current route prior to the amount of the deposit in the aftertreatment system exceeding a second threshold based on the stored route, and, responsive to a determination that the passive regeneration event will not occur prior to the amount of the deposit in the aftertreatment system exceeding the second threshold, trigger an active regeneration event.

Technically and beneficially, the present disclosure enables management of active and passive regeneration events for components in an aftertreatment system in response to an analysis of and comparison to historical route data. In operation and as described herein, the present disclosure enables analyzing data from other vehicles, using cloud-based analytics, in order to determine duty cycles and other relevant usage information, and then design control strategies for vehicle components in order to optimally manage the aftertreatment system based on the analysis. By associating a current route of a vehicle with a designed control strategy, the system is able to determine or predict the behavior or status of aftertreatment system components in the vehicle as the vehicle proceeds down the current route. By anticipating when the components will need to be regenerated and either incorporating the regeneration into a previously planned down-time or foregoing an off-duty regeneration with the knowledge that conditions for an on-duty regeneration are imminent, the system provides savings for fuel, diesel exhaust fluid (DEF) usage, and energy as well as more accurately maintaining aftertreatment system performance. Further, the system may reduce hardware costs by removing sensors previously used to track regeneration events, and may reduce processing drain on the vehicle's computing system by removing complicated models.

Referring now to FIG. 1, a system 100 that includes a remote computing system 35 coupled to a vehicle 10 is shown, according to an example embodiment. The vehicle 10 includes an engine 12, an aftertreatment system 70, a positioning system 42, a telematics unit 30, and a controller 26. The vehicle 10 can be any type of on-road or off-road vehicle including, but not limited to, line-haul trucks, mid-range trucks (e.g., pick-up truck, etc.), sedans, coupes, tanks, airplanes, boats, and any other type of vehicle. Based on these configurations, various additional types of components may also be included in the system, such as a transmission, one or more gearboxes, pumps, actuators, and so on.

The engine 12 may be any type of internal combustion engine. Thus, the engine 12 may be a gasoline, natural gas, or diesel engine, a hybrid engine (e.g., a combination of an internal combustion engine and an electric motor), and/or any other suitable engine. Here, the engine 12 is a diesel-powered compression-ignition engine. The engine 12 includes a cylinder deactivation ("CDA") system 44 structured to selectively activate or deactivate a first cylinder 112, a second cylinder 114, a third cylinder 116, a fourth cylinder 118, a fifth cylinder 120, and a sixth cylinder 122 (collectively referred to herein as "cylinders 112-122"). It should be understood that, while six cylinders are represented in FIG. 1, the number of cylinders may vary depending upon system configurations and requirements. The cylinders 112-122 can be any type of cylinders suitable for the engine in which they are disposed (e.g., sized and shaped appropriately to receive pistons).

The CDA system 44 is structured or configured to receive signals from the controller to selectively activate and/or deactivate (i.e. combustion does not occur) one or more of cylinders 112-122 during operation of the engine 12. The CDA system operates to deactivate various cylinders of the engine (i.e., combustion does not occur), such that power from the engine is provided from less than all of the cylinders. The CDA system 44 may include/control components to enable a CDA operating mode (e.g., intake valves, exhaust valves, solenoids to control the opening/closing of the valves, etc.). In some situations, one or more of the air intake valves may be closed so to not allow air for combustion to flow into the cylinder thereby preventing combustion. In other situations, air may be allowed to flow through the cylinder but combustion is prevented via no spark or diesel fuel injection. Thus, "deactivation" of a cylinder may be accomplished in a variety of ways. A dynamic skip-fire ("DSF") system is a type of cylinder deactivation ("CDA") system. A DSF system operates an engine in a DSF mode, where one or more cylinders are deactivated/inactive (e.g., combustion does not occur) on a cycle-by-cycle and/or cylinder-by-cylinder basis. Accordingly, a cylinder may be inactive for a first engine cycle and active for a second engine cycle. Another type of CDA operating mode is known as "fixed cylinder CDA." In fixed cylinder CDA, the same cylinder(s) are active/inactive during the duration of the fixed cylinder CDA operating mode. An "active" cylinder means that combustion is allowed to occur in that cylinder. Operating an engine in DSF or fixed-cylinder CDA modes can increase the temperature of the exhaust gas by reducing the overall flow of exhaust gas and/or requiring the active cylinders to produce the same amount of total work as the engine produced prior to entering a DSF mode. The CDA system 44 is configured or structured to operate in either the DSF mode or the fixed cylinder CDA operating mode.

Using fewer than the maximum number of cylinders 112-122 (in this exemplary embodiment, the maximum is 6) results in improved fuel economy because operating a reduced number of cylinders requires a reduced amount of fuel. However, using fewer than 6 of the cylinders 112-122 also results in a reduced power output, which may make navigating some roads and inclines difficult. Using fewer than 6 of the cylinders 112-122 also results in an increased exhaust temperature than that produced during operation with all 6 cylinders 112-122 because the cylinders 112-122 that are activated operate at a higher combustion pressure to compensate for any inactive cylinders 112-122, which results in a higher combustion temperature. Thus, the CDA system 44 can be employed to increase the exhaust temperature without consuming additional fuel, thereby improving vehicle 10 performance while reducing fuel and DEF usage.

The aftertreatment system 70 is in exhaust-gas receiving communication with the engine 12. The aftertreatment system includes a diesel oxidation catalyst (DOC) 72, a diesel particulate filter (DPF) 74, a reductant delivery system 78, a selective catalytic reduction (SCR) system 76, an ammonia slip catalyst (ASC) 80, and a heater 48. The DOC 72 is structured to receive the exhaust gas from the engine 12 and to oxidize hydrocarbons and carbon monoxide in the exhaust gas. The DPF 74 is arranged or positioned downstream of the DOC 72 and structured to remove particulates, such as soot, from exhaust gas flowing in the exhaust gas stream. The DPF 74 includes an inlet, where the exhaust gas is received, and an outlet, where the exhaust gas exits after having particulate matter substantially filtered from the exhaust gas and/or converting the particulate matter into carbon dioxide. In some implementations, the DPF 74 may be omitted.

The aftertreatment system 70 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR catalyst member by a DEF doser 78 such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 70. The aftertreatment system 70 may further include an oxidation catalyst (e.g. the DOC 72) fluidly coupled to the exhaust gas conduit system to oxidize hydrocarbons and carbon monoxide in the exhaust gas. In order to properly assist in this reduction, the DOC 72 may be required to be at a certain operating temperature. In some embodiments, this certain operating temperature is between 200-500° C. In other embodiments, the certain operating temperature is the temperature at which the conversion efficiency of the DOC 72 exceeds a predefined threshold (e.g. the conversion of HC to less harmful compounds, which is known as the HC conversion efficiency).

The SCR 76 is configured to assist in the reduction of NOx emissions by accelerating a NOx reduction process between the ammonia and the NOx of the exhaust gas into diatomic nitrogen, water, and/or carbon dioxide. If the SCR catalyst member is not at or above a certain temperature, the acceleration of the NOx reduction process is limited and the SCR 76 will not be operating at a necessary level of efficiency to meet regulations. In some embodiments, this certain temperature is 250-300° C. The SCR catalyst member may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum).

The ASC 80 may be any of various flow-through catalysts, such as an ammonia oxidation (AMOX) catalyst, structured to react with ammonia to produce mainly nitrogen. The ASC 80 is structured to remove ammonia that has slipped through or exited the SCR 76 without reacting with NOx in the exhaust. In certain instances, the aftertreatment system 70 can be operable with or without the ASC 80. Further, although the ASC 80 is shown as a separate unit from the SCR 76 in FIG. 1, in some implementations, the ASC 80 may be integrated with the SCR 76, e.g., the ASC 80 and the SCR 76 can be located within the same housing. According to the present disclosure, the SCR 76 and ASC 80 are positioned serially, with the SCR 76 preceding the ASC 80.

Because the aftertreatment system 70 treats the exhaust gas before the exhaust gas is released into the atmosphere, much of the particulate matter or chemicals that are treated or removed from the exhaust gas build up in the aftertreatment system over time. For example, the soot filtered out from the exhaust gas by the DPF 74 builds up on the DPF 74 over time. Similarly, sulfur particles, which may remain in the exhaust gas as a result of incomplete combustion of fuel, accumulate in the SCR 76 and deteriorate the effectiveness of the SCR catalyst member. Further, DEF that undergoes incomplete thermolysis upstream of the catalyst may build up and form deposits on downstream components of the aftertreatment system 70. However, these build-ups on (and subsequent deterioration of effectiveness of) these components of the aftertreatment system 70 are reversible. In other words, the soot, sulfur, and DEF deposits may be substantially removed from the DPF 74 and the SCR 76 by increasing a temperature of the exhaust gas running through the aftertreatment system to recover performance (e.g. for the SCR, conversion efficiency of NOx to $N_2$ and other compounds). These removal processes are referred to as regeneration events and may be performed for the DPF 74, SCR 76, or any other component in the aftertreatment system 70 on which deposits develop.

In some embodiments, the heater 48 is located in the exhaust flow path before the aftertreatment system 70 and is structured to controllably heat the exhaust gas upstream of the aftertreatment system 70. The heater 48 may be any sort of external heat source that can be structured to increase the temperature of passing exhaust gas, which, in turn, increases the temperature of components in the aftertreatment system 70, such as the DOC 72 or the SCR catalyst member, thereby improving vehicle 10 performance while reducing fuel and DEF usage. As such, the heater may be an electric heater, an induction heater, a microwave, or a fuel-burning (e.g., HC fuel) heater. As shown here, the heater 48 is an electric heater that draws power from a battery of the vehicle 10.

A regeneration event may be triggered (i.e., the temperature of the exhaust gas is raised to a target regeneration temperature) actively or passively. An active regeneration event is a regeneration event in which the temperature of the exhaust gas is raised by methods other than normal operation of the engine (i.e., regeneration is specifically commanded via one or more processes). For example, an active regeneration event includes activating the heater 48 to raise the temperature of the exhaust gas. In another example, an active regeneration event includes triggering the CDA system 44 to selectively deactivate at least one of the cylinders 112-122 to increase the temperature of the exhaust gas. An active regeneration event can also include commanded injection of fuel into the exhaust stream, thereby raising a temperature of the exhaust gas. In contrast, a passive regeneration event is a regeneration event in which the temperature of the exhaust gas is raised through normal operation of the engine 12, which causes regeneration of a catalyst or component. For example, if the vehicle is climbing a large hill, the heat energy generated by the engine 12 during the climb may heat the exhaust gas to the target regeneration temperature, thereby triggering a passive regeneration event. A passive regeneration event may also be assisted or altered by the heater 48 and/or the CDA system 44, which can be activated in order to reduce the time to reach a target regeneration temperature and to sustain an exhaust gas temperature greater for a relatively longer period of time than may be otherwise provided by the passive regeneration event. In other words, the heater 48 and/or the CDA system 44 may operate to alter when a passive regeneration event occurs (i.e., expedite occurrence via activation of, e.g., the heater) and a duration of the passive regeneration event. As an example, a passive regeneration event may result in an exhaust gas temperature being at or above a target regeneration temperature for a period of X seconds (the target regeneration temperature may be different based on the catalyst and generally refers to the temperature of the exhaust gas or component required to burn off the unwanted soot or buildup on the catalyst). As the exhaust gas temperature is decreasing (signaling the end of the passive regeneration event), the heater is activated to continue to heat the exhaust gas temperature or component. This functions to prolong the duration of the regeneration event. As another example, the heater and/or CDA system may be active before the passive regeneration event occurs which may function to trigger the passive regeneration event earlier than otherwise would have happened. A combination of the heater 48 and the CDA system 44 can also reduce the fuel cost required to execute a passive regeneration event, thereby reducing overall cost.

The telematics unit 30 may be structured as any type of telematics control unit. Accordingly, the telematics unit 30 may include, but is not limited to, one or more memory devices for storing tracked data, one or more electronic processing units for processing the tracked data, and a communications interface for facilitating the exchange of data between the telematics 30 and one or more remote devices (e.g., the remote computing system 35). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 30 may also include a communications interface for communicating with the controller 26 of the vehicle 10. The communication interface for communicating with the controller 26 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 26 and the telematics unit 30. In other embodiments, a local area network (LAN), a wide area network (WAN), or an external computer (for example, through the Internet using an Internet Service Provider) may provide, facilitate, and support communication between the telematics unit 30 and the controller 26. In still another embodiment, the communication between the telematics unit 30 and the controller 26 is via the unified diagnostic services (UDS) protocol. All such variations are intended to fall within the spirit and scope of the present disclosure.

The positioning system 42 is configured to detect a position of the vehicle 10 at a point in time. In some embodiments, that point in time is the present moment, while in other embodiments, that point in time is upcoming and in the future. In an exemplary embodiment, the positioning system 42 is a global positioning system (GPS) in which the positioning system 42 receives GPS data from a satellite(s) and facilitates position-based communication with the satellite(s) and the controller 26. In another exemplary embodiment, the positioning system 42 is a communication system connecting the vehicle 10 to other vehicles in a fleet 90 and receives a position of the vehicle 10 based on the relative position of the vehicle 10 to the other vehicles in the fleet 90, such as through triangulation. In another exemplary embodiment, the positioning system 42 is a communication system in communication with a plurality of beacons such that a position of the vehicle 10 is determined based on the position of the vehicle 10 relative to the plurality of beacons. This plurality of beacons may be towers built at certain points along roadways, existing infrastructure in place to collect tolls, or cell towers, to name but a few. Thus, the positioning system 42 may be included with telematics unit 30.

The positioning system 42 is any combination of these embodiments such that one embodiment may prevail if another is malfunctioning. For example, if the GPS is down, the positioning system 42 may rely on triangulation with other fleet 90 vehicles.

The controller 26 is coupled to the engine 12, the aftertreatment system 70, the telematics unit 30, and the positioning system 42, and is structured or configured to at least partly control the aftertreatment system 70 and, in some embodiments, the engine 12. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. In this regard, the controller 26 may be configured to receive signals, information, data, etc. (e.g., engine operating parameter signals and/or aftertreatment system operating parameter signals) from sensors such as exhaust flow rate sensors, speed sensors, pressure sensors, temperature sensors, and/or any other sensors associated with the engine 12 or the aftertreatment system 70.

As the components of FIG. 1 are shown to be embodied in the vehicle 10, the controller 26 may be structured as one or more electronic control units (ECU). The function and structure of the controller 26 is described in greater detail in FIG. 3. Alternatively, at least some or all of the operations described herein of the controller 26 may be performed by the remote computing system 35, in addition to the other operations performed by the remote computing system 35. The telematics unit 30 may transmit received or determined information about the vehicle 10 (e.g., engine operating parameter signals and/or aftertreatment system operating parameter signals) to the remote computing system 35 for performing at least some of the operations described herein remotely. The remote computing system 35 may include one or more servers, network interfaces, input/output devices, and so on.

As shown in FIG. 1, the remote computing system 35 is in communication with the vehicle 10 via a network 51. The network 51 may be any type of communication protocol that facilitates the exchange of information between and among the vehicle 10 and the remote computing system 35. In this regard, the network 51 may communicably couple the vehicle 10 with the remote computing system 35. In one embodiment, the network 51 may be configured as a wireless network. In this regard, the vehicle 10 may wirelessly transmit to and receive data from the remote computing system 35. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 26 and/or telematics unit 30 of the vehicle 10 may electrically, communicably, and/or operatively couple via fiber optic cable to the network 51 to selectively transmit to and receive data wirelessly to and from the remote computing system 35.

The remote computing system 35 may also be in communication with the fleet 90 of vehicles to receive and store information regarding performance of a plurality of vehicles in the fleet 90. In these embodiments, the remote computing system 35 creates and curates a database of vehicle information that contains information related to vehicle performance (e.g., engine performance parameters) for the plurality of vehicles on a plurality of routes. The remote computing system 35 is configured to perform advanced analytics to determine and identify patterns in the information. These advanced analytics may be Artificial Intelligence (AI), physics-based models, machine learning, etc. The determined and identified patterns may relate to repeated instances of similar parameter values (e.g., sulfur deposit amounts) for a vehicle(s) along similar routes. These patterns may be associated with a particular vehicle in the fleet 90 or may be associated with a particular type of vehicle (e.g., vehicle with internal combustion engine that runs on diesel fuel), or these patterns may be associated with a particular route.

The remote computing system 35 is configured to design an optimal control strategy for the plurality of vehicles (or, at least one vehicle) in the fleet 90 in response to the determined and identified patterns from the advanced analytics. As discussed above with regard to regeneration events, the remote computing system 35 may design a strategy for timings and/or durations of regeneration events, which may include, in some embodiments, skipping previously planned active regeneration events. in part by balancing active and passive regeneration events in order to maintain aftertreatment system performance throughout a route by leveraging the patterns identified in the information received from the telematics unit 30 from, e.g., other vehicles. For example, if the remote computing system 35 identified a pattern in information received from a similar or different vehicle that tends to show an extended period of elevated exhaust temperature at a certain point along a repeated route, the remote computing system 35 determines that a passive regeneration event is likely to occur at that certain point along the repeated route, so the optimal control strategy designed by the remote computing system 35 would defer an active regeneration event that might otherwise be triggered because the remote computing system 35 anticipates the passive regeneration event.

The optimal control strategy may also relate to DEF usage by including information regarding patterns of SCR 76 temperature, ammonia storage, and/or ammonia-to-NOx ratio (ANR) among other vehicles in the fleet 90. As such, the optimal control strategy can provide savings on DEF usage through correlation of current vehicle 10 performance with the identified repeatable patterns of SCR 76 temperature, ammonia storage, and/or ANR. Similarly, the optimal control strategy can minimize system-out NOx amounts and the amount of ammonia slip through a correlation with these same three operating parameters.

Figure 2:
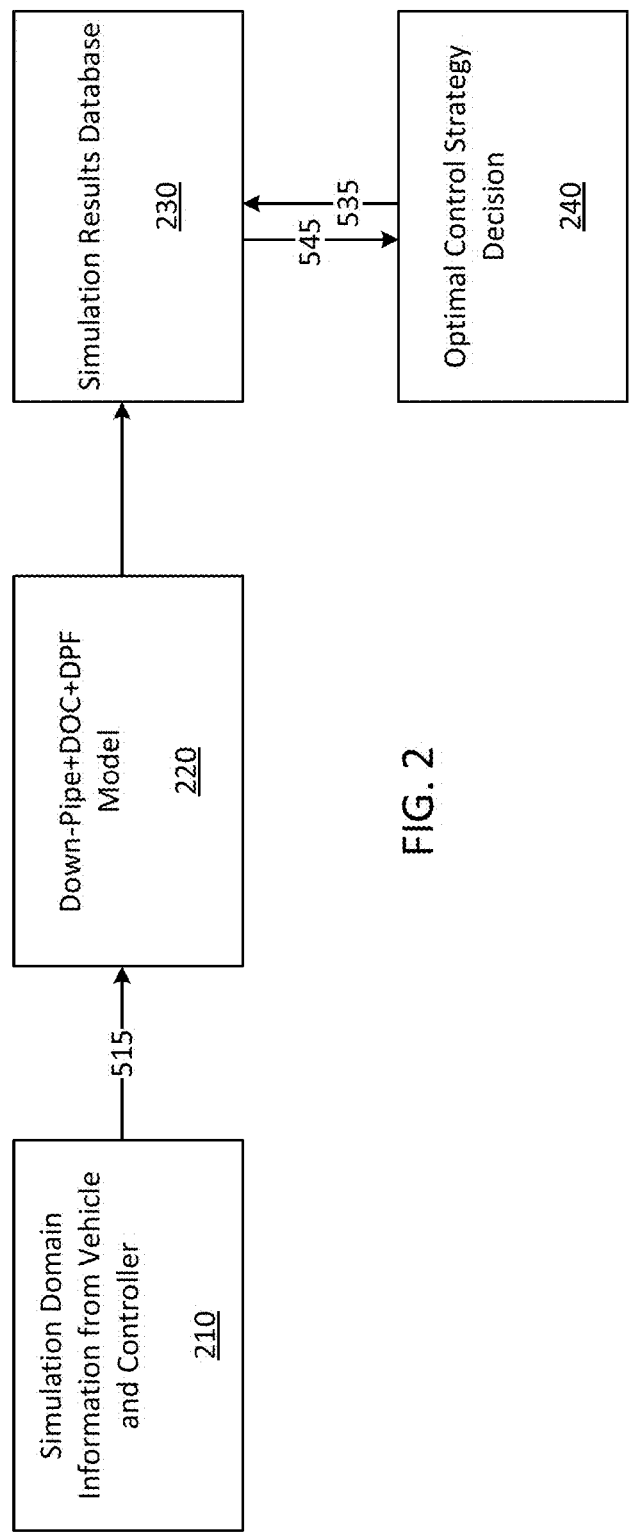
FIG. 2 is a schematic view of a model framework, according to an example embodiment.

FIG. 2 is a model framework for the remote computing system 35 and advanced analytics. At 210, the simulation domain information is provided by the controller. At 215, the simulation domain transmits various operating parameters (e.g., amount of particulate matter, amount of NOx, flow rate of exhaust, temperature of exhaust, amount of HC, etc.) to the down-pipe+DOC+DPF model at 220. For the model at 220, it is assumed that formulation and catalyst loading/cell density are known. At 230, the simulation results from the model are saved. At 235, the controller sends information indicative of the engine operating conditions, including entry and exit soot load, to the simulation results database, which locates a corresponding regen frequency for the given engine state based on a look-up script at 245. The look-up script returns a regeneration interval and a mean soot oxidation rate between the entry and exit soot load provided.

In one embodiment, the remote computing system 35 is in continuous or near continuous communication with the controller 26 via network 51 and telematics unit 30 in order to provide real-time control over the vehicle 10 throughout use. This embodiment is referred to as an "on-line method," such that the controller 26 maintains an on-line relationship with the remote computing system 35 while the vehicle 10 is in use (i.e., operating along a route). While in operation with the on-line method, the controller 26 is continuously sending operational information (e.g., exhaust temperature, engine speed, torque, etc.) and location information from the positioning system 42 to the remote computing system 35. The remote computing system 35 receives this information and, in real-time, applies the designed optimal control strategy in order to manage aftertreatment system performance of the vehicle 10 as conditions develop and change. For example, if the remote computing system 35 is originally applying an optimal control strategy based on a first route, but the vehicle 10 deviates from that first route onto a second route, the remote computing system 35 receives indication of that deviation from the controller 26 immediately and alters the applied optimal control strategy to that which the remote computing system 35 designed for the second route. In some embodiments utilizing the on-line method, the remote computing system 35 assumes some of the duties of the controller 26, such that the remote computing system 35 performs the correlation between current data and the optimal control strategies and issues commands to vehicle 10 components accordingly.

In another embodiment, the remote computing system 35 transmits an optimal control strategy to the vehicle 10 before the vehicle 10 departs on a route. This embodiment is referred to as an "off-line method," such that the controller 26 maintains an off-line relationship with the remote computing system 35 while the vehicle 10 is in use (i.e., operating along a route). Because the controller 26 is not in active communication with the remote computing system 35 during operation of the vehicle, the remote computing system 35 transmits the optimal control strategy (or strategies) to the controller 26 before the vehicle 10 departs (e.g., while the vehicle is in a service bay, in a parked non-mobile state, etc.), and the controller 26 downloads (e.g., stores in the memory 53, etc.) the optimal control strategy (or strategies). In some embodiments, the controller 26 receives and stores a single optimal control strategy based on a type of the vehicle and/or a planned route. In other embodiments, the controller 26 receives and stores multiple optimal control strategies based on the type of the vehicle and/or planned route. In these embodiments, the controller 26 may download every optimal control strategy associated with the type of vehicle that the vehicle 10 belongs to in order to account for possible deviations from the planned route or deviations from normal (or pre-planned) behaviors. In other of these embodiments, the controller 26 may download every or nearly every optimal control strategy associated with the planned route of the vehicle 10 in order to account for changes in external conditions (e.g., weather, traffic, etc.) that may alter vehicle 10 performance.

Figure 3:
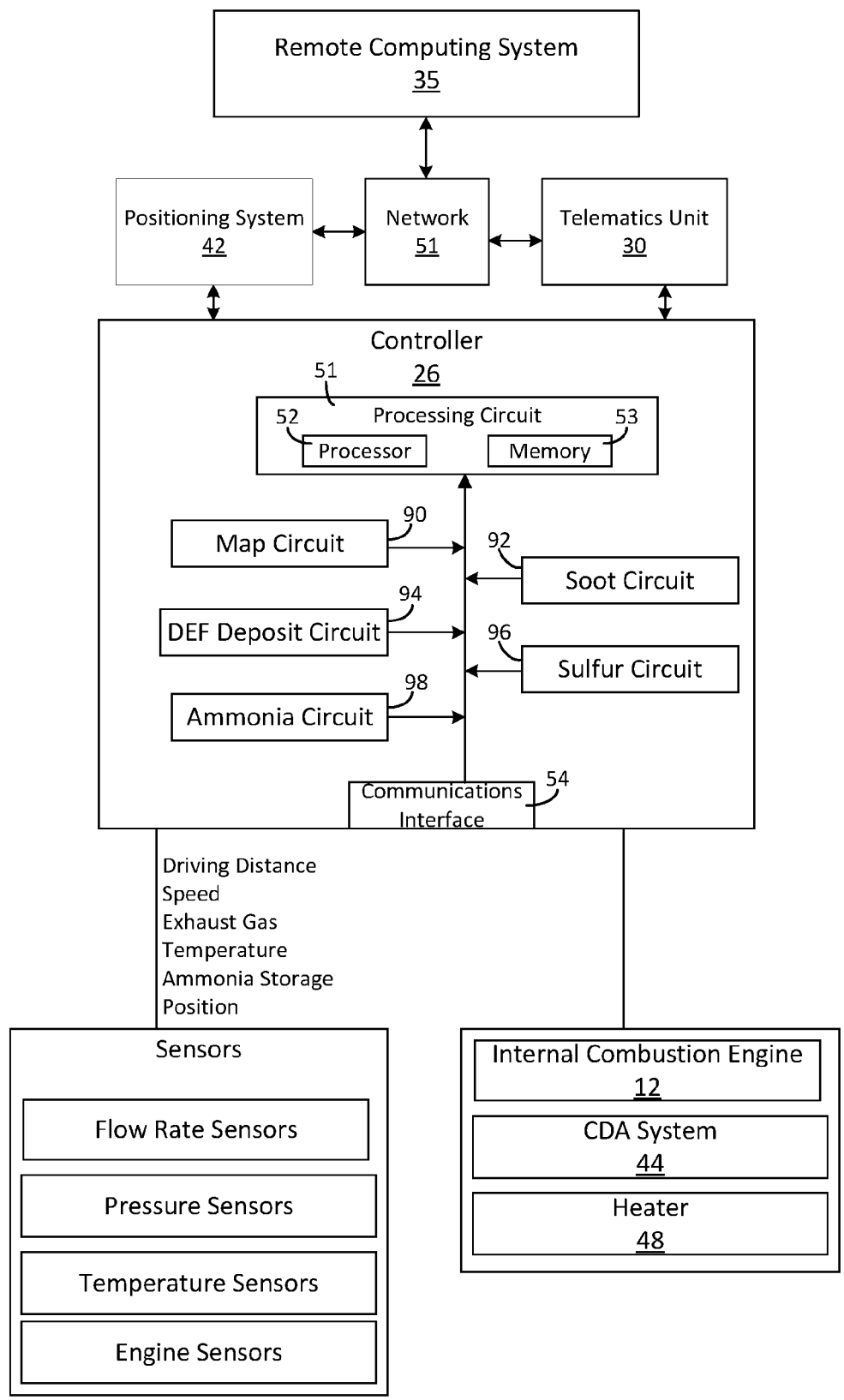
FIG. 3 is a schematic view of a controller of the vehicle of FIG. 1, according to an example embodiment.

Referring now to FIG. 3, a schematic diagram of the remote computing system 35 and the controller 26 of the vehicle 10 of FIG. 1 is shown according to an example embodiment. As shown in FIG. 3, the controller 26 includes a processing circuit 51 having a processor 52 and a memory 53, a map circuit 90, a soot circuit 92, a DEF deposit circuit 94, a sulfur circuit 96, an ammonia circuit 98, and a communications interface 54. The controller 26 is structured to correlate a current position of the vehicle 10 on a current route with an optimal control strategy received from the remote computing system 35 (in either on-line or off-line method) in order to predict an upcoming status of the vehicle 10 and manage its components accordingly. For example, if an amount of sulfur accumulation reaches unacceptable levels, the controller 26 would, in normal operation, initiate a regeneration event (e.g. turn on the heater 48 engage the CDA system 44 etc.) in order to raise a temperature of the exhaust gas and burn off the sulfur deposits. However, if the optimal control strategy indicates that a sulfur regeneration will occur (i.e. the exhaust gas will get hot enough to burn off sulfur deposits) through standard operation of the engine 12, the controller 26 may delay an initiation of the sulfur regeneration event (i.e. do not turn on the heater 48, do not engage the CDA system, etc.) in order to utilize the sulfur regeneration that will occur through standard operation.

The remote computing system 35 may be a computing system that is separate from the controller 26 and other computing system(s) contained within the vehicle. In an example embodiment, the remote computing system 35 is a cloud-based computing system hosted on at least one server. As shown in FIG. 3, the remote computing system 35 is in communication with the controller 26 via the telematics unit, which facilitates two-way transmission of data (i.e., from the remote computing system 35 to the controller 26, and from the controller 26 to the remote computing system 35. The remote computing system 35 is structured or configured to receive information from the controller 26 related to the vehicle, including sensed operation information (e.g., performance parameters, route information, location information), input from a user of the vehicle, or a planned travel route. The remote computing system 35 stores this received information for a plurality of vehicles in a database as historical data. The remote computing system 35 then determines an optimal control strategy by applying advanced analytics to stored historical data associated with operation of vehicle(s) in a fleet 90 of vehicles. This historical data includes performance parameters indicative of vehicle performance, as well as location information that is correlated with the performance parameters in order to illustrate performance of a vehicle based on position along a route. The advanced analytics includes artificial intelligence (AI), physic-based models, machine learning that is employed to identify vehicles in the fleet 90 that have strong repeatable driving patterns (i.e., patterns within the data that meet certain thresholds for statistical relevance). Based on these vehicles with strong repeatable driving patterns, the remote computing system 35 predicts the performance parameters of similar vehicles and designs optimal control strategies in order to balance these performance parameters. These optimal control strategies may identify opportunities to save fuel or reduce DEF usage by incorporating passive regeneration events in the place of standard active regeneration.

The remote computing system 35 relays these optimal control strategies via either an on-line method or an off-line method. If the on-line method is utilized, the remote computing system 35 remains in network-based communication via the network 51 with the controller 26 throughout use, such that the optimal control strategy applied to the particular period of use of the vehicle 10 can be continuously updated or re-selected based on changing conditions throughout use. If the off-line method is utilized, the remote computing system 35 does not remain in network-based communication with the controller 26 throughout use, so the controller 26 downloads selected optimal control strategies from the remote computing system 35 via the network 51 prior to the connection being severed.

In some embodiments, these performance parameters include, but are not limited to, an amount of accumulated soot in the aftertreatment system 70, an amount of accumulated sulfur in the aftertreatment system 70, an amount of DEF remaining in the reductant delivery system, and an amount of NOx emissions from a tailpipe of the vehicle 10. The controller 26 may be configured to correlate current route information to the optimal control strategies at a predefined time interval or a non-time based interval, such as a duty cycle or distance along a route, to pre-emptively determine (or predict) values of the performance parameters along the current route. As such, the controller 26 is able to use this pool of information from previous runs in a feed-forward loop manner by utilizing the remote computing system's analysis of past performance parameters (e.g., DPF inlet temperature at duration of time into a stored route) to predict performance parameters along a current route.

Figure 4:
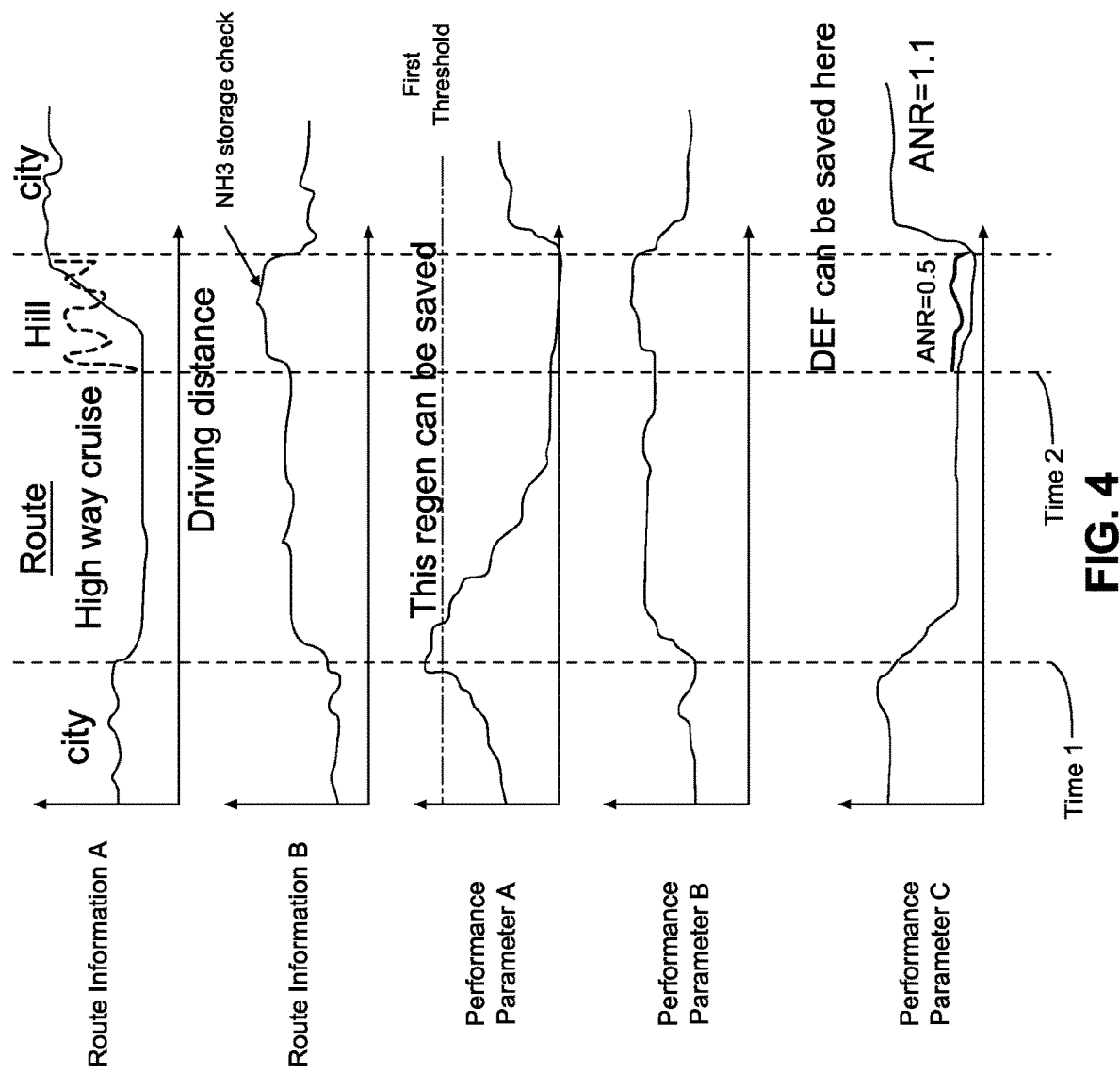
FIG. 4 is a set of charts tracking various parameters for an example route, according to an example embodiment.

As shown in FIG. 4, a first route information A may be an altitude of a vehicle as a function of driving distance along a route, and the second route information B may be a temperature of exhaust gas entering an aftertreatment system as a function of driving distance along the route. In some embodiments, the first route information A and the second route information B may be used to correlate a current position along the route of the vehicle 10 with the stored position information of similar vehicles. In other embodiments, only the first route information A of the second route information B is used to correlate the current position of the vehicle 10 along a route to the stored position information of similar vehicles along the route. Then, as shown in FIG. 4, a first performance parameter A is an amount of soot accumulation in an aftertreatment system as a function of driving distance along the route. A second performance parameter B is a NOx conversion efficiency of an SCR system as a function of driving distance along the route. A third performance parameter C is a quantity of NOx emissions from the aftertreatment system (i.e., system-out or tailpipe NOx) as a function of driving distance along the route. While these three performance parameters are shown here, other performance parameters (such as an amount of sulfur accumulation or DEF deposits) may be used.

The particular examples shown in FIG. 4 illustrate an exemplary route for a vehicle. As seen in this exemplary route, around Time 1, the amount of soot accumulation has reached a level at which a regeneration event would typically be triggered. However, in looking at the optimal control strategy designed by the remote computing system 35 regarding the first performance parameter A, the controller 26 determines that the regeneration will occur through standard operation of the vehicle 10 along the route, as shown by the decreasing amount of soot accumulation as the driving distance increases. Further, as seen around Time 2, due to an increase in exhaust temperature that results from the extra power output generated during a hill climb (as evidenced by the increase in the first route information A at time 2), the NOx conversion efficiency will increase as the hotter exhaust warms the SCR 76 to a more efficient temperature. As such, the controller 26 can alter the timing and/or amount of DEF dosing based on the optimal control strategy. In this example, the controller 26 determines that less DEF will be needed to accelerate NOx conversion and can reduce DEF usage in order to not only preserve DEF but also avoid ammonia slip while still maintaining an acceptable level of system-out NOx emissions (e.g., minimizing NOx emissions in order to meet emissions targets). The controller can also more accurately tune DEF dosing by predicting ammonia storage, which operates largely as a function of SCR 76 temperature, through associating the SCR 76 temperature from a stored map to the position of the vehicle 10 along the current route. Alternatively, an amount of ammonia storage is itself a performance parameter for a which an optimal control strategy is designed by the remote computing system 35, such that the controller 26 can determine or predict an amount of ammonia storage for the vehicle 10 by associating the position of the vehicle 10 along a current route with the optimal control strategy based on the strong repeatable patterns of other vehicles.

In one embodiment, the controller 26 continually monitors the current route information (e.g., positional information, vehicle elevation) and current operational parameters (e.g., exhaust pressure, system-out NOx) in order to continuously the correlate current route information to optimal control strategy (or strategies) at each time interval (or other non-time based interval) to associate the current route with an optimal control strategy. As such, if the controller 26 initially associates the current route with a first optimal control strategy, but later current route information deviates from the route information from the first optimal control strategy, the controller may re-evaluate the current route information (i.e., in a feedback loop) in order to determine the correct optimal control strategy. Further, in an exemplary embodiment, the controller 26 receives real-time data indicative of weather conditions and utilizes the weather condition data to make determinations. This weather condition data includes ambient pressure, rain, snow, humidity levels, etc. For example, if the weather condition data indicates rain is present, the controller 26 determines that overall NOx levels are reduced because the moisture reduces the temperature of the combustion chambers in the engine 12, thereby reducing the amount of NOx produced through combustion. The controller 26 performs this continuous monitoring in both on-line and off-line methods. In the on-line method, the controller 26 transmits the continually-monitored data to the remote computing system 35 in order to correlate the data to the entirety of the strong repeatable patterns and optimal control strategies stored on the database In the off-line method, the controller 26 compares the continually-monitored data to the previously-downloaded optimal control strategies stored in the memory 53.

In one configuration, the map circuit 90, the soot circuit 92, the DEF deposit circuit 94, the sulfur circuit 96, and the ammonia circuit 98 are embodied as machine or computer-readable media storing instructions that are executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the map circuit 90, the soot circuit 92, the DEF deposit circuit 94, the sulfur circuit 96, and the ammonia circuit 98 are embodied as hardware units, such as electronic control units. As such, the map circuit 90, the soot circuit 92, the DEF deposit circuit 94, the sulfur circuit 96, and the ammonia circuit 98 may be embodied as one or more circuitry components including, but not limited to, processing circuitry, network interfaces, peripheral devices, input devices, output devices, sensors, etc. In some embodiments, the map circuit 90, the soot circuit 92, the DEF deposit circuit 94, the sulfur circuit 96, and the ammonia circuit 98 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the map circuit 90, the soot circuit 92, the DEF deposit circuit 94, the sulfur circuit 96, and the ammonia circuit 98 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The map circuit 90, the soot circuit 92, the DEF deposit circuit 94, the sulfur circuit 96, and the ammonia circuit 98 may also include programmable hardware devices such as field programmable gate arrays, programmable array logic, programmable logic devices or the like. The map circuit 90, the soot circuit 92, the DEF deposit circuit 94, the sulfur circuit 96, and the ammonia circuit 98 may include one or more memory devices for storing instructions that are executable by the processor(s) of the map circuit 90, the soot circuit 92, the DEF deposit circuit 94, the sulfur circuit 96, and the ammonia circuit 98. The one or more memory devices and processor(s) may have the same definition as provided below with respect to the memory 53 and processor 52. In some hardware unit configurations, the map circuit 90, the soot circuit 92, the DEF deposit circuit 94, the sulfur circuit 96, and the ammonia circuit 98 may be geographically dispersed throughout separate locations in the vehicle. Alternatively and as shown, the map circuit 90, the soot circuit 92, the DEF deposit circuit 94, the sulfur circuit 96, and the ammonia circuit 98 may be embodied in or within a single unit/housing, which is shown as the controller 26.

In the example shown, the controller 26 includes the processing circuit 51 having the processor 52 and the memory 53. The processing circuit 51 may be structured or configured to execute or implement the instructions, commands, and/or control processes described herein with respect to the map circuit 90, the soot circuit 92, the DEF deposit circuit 94, the sulfur circuit 96, and the ammonia circuit 98. The depicted configuration represents the map circuit 90, the soot circuit 92, the DEF deposit circuit 94, the sulfur circuit 96, and the ammonia circuit 98 as machine or computer-readable media storing instructions. However, as mentioned above, this illustration is not meant to be limiting as the present disclosure contemplates other embodiments where the map circuit 90, the soot circuit 92, the DEF deposit circuit 94, the sulfur circuit 96, and the ammonia circuit 98, or at least one circuit of the map circuit 90, the soot circuit 92, the DEF deposit circuit 94, the sulfur circuit 96, and the ammonia circuit 98, is configured as a hardware unit. All such combinations and variations are intended to fall within the scope of the present disclosure.

The processor 52 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the map circuit 90, the soot circuit 92, the DEF deposit circuit 94, the sulfur circuit 96, and the ammonia circuit 98 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 53 (e.g., memory unit, storage device) may include one or more devices (e.g., RAM, ROM, Flash memory, hard disk storage) for storing data and/or computer code for completing or facilitating the various processes, layers and modules described in the present disclosure. The memory 53 may be communicably connected to the processor 52 to provide computer code or instructions to the processor 52 for executing at least some of the processes described herein. Moreover, the memory 53 may be or include tangible, non-transient volatile memory or non-volatile memory. Accordingly, the memory 53 may include database components, object code components, script components, or any other type of information structure for supporting the various activities and information structures described herein.

The map circuit 90 is configured to correlate a current driving pattern or route with an optimal control strategy designed by the remote computing system 35 in order to predict characteristics of the vehicle and aftertreatment system 70 along the route. In some embodiments, this optimal control strategy is from the same vehicle on a prior trip(s), while in other embodiments, this optimal control strategy is from a different vehicle or pool of different vehicles. In some embodiments, the map circuit 90 utilizes a pre-determined map that is set prior to the vehicle's departure on the route (i.e., associates a pre-planned route with a stored optimal control strategy). In other embodiments, the map circuit 90 matches the current driving route with the optimal control strategy based on position information from the positioning system 42. In further embodiments, information received from the sensors regarding a status of vehicle components (e.g., an amount of accumulation of soot, a temperature of the SCR catalyst may be used to correlate the current route with an optimal control strategy. For example, if the SCR catalyst temperature as captured along the current route so far matches an SCR catalyst temperature pattern from an identified strong repeatable pattern from a vehicle in the remote computing system 35 database, the map circuit 90 determines that the vehicle is following a substantially similar route to that vehicle and follows a related optimal control strategy.

The soot circuit 92 is structured or configured to determine an accumulation of soot in the aftertreatment system 70 and to either initiate or defer a regeneration event based on stored data. The soot circuit 92, based on data from the sensors indicative of a quantity of soot build-up on the DPF, determines that a regeneration event is required in order to recover performance of the DPF. This determination may be made if the data show an increase of particulates in the exhaust flow after the DPF or that the amount of particulates in the exhaust flow after the DPF exceeds a pre-determined threshold, which would indicate that the DPF is no longer filtering particulates from the exhaust at an acceptable level. Alternatively, this determination may be made if the data shows a decrease in the overall flow rate of exhaust gas after the DPF, which indicates that the flow of exhaust is impeded by an excess of soot build-up on the DPF. The soot circuit 92 then, based on an analysis of the optimal control strategy from the remote computing system 35 that is correlated by the map circuit 90, determines if a passive regeneration event will or will likely occur within a predefined period of time such that an active regeneration event is not required to maintain an acceptable level of performance from the DPF (i.e., the engine 12 will generate enough heat energy through normal operation to burn off the soot deposits before the DPF is unable to properly filter out particulates from the exhaust). As such, there may be two separate thresholds for DPF performance in the optimal control strategy: one that signals that a regeneration event is required soon and one that indicates that a regeneration event is required immediately. In some embodiments, the second threshold is equivalent to the local emissions regulations or predefined emissions regulation stored in the controller. The first threshold acts as an indicator for the controller to begin comparing the current route information to the optimal control strategy. In this way, the first threshold reduces processing strain on the processor 52 by triggering the comparison at a particular time rather than having the comparison running in the background at all times. In some embodiments, the first threshold may be omitted.

If the soot circuit 92 determines that a passive regeneration event will occur within such a period of time that DPF performance will not reach the second threshold (i.e., DPF performance is not so impeded as to cause the aftertreatment system 70 to be unable to meet emissions regulations), the soot circuit 92 either takes no action or cancels an active regeneration event that would have otherwise been scheduled. If the soot circuit 92 determines that such a passive regeneration event will not occur within the period of time, then the soot circuit 92 issues a command to various components of the vehicle 10 (e.g., the heater 48, the CDA system 44, etc.) to initiate an active regeneration event. The controller 26 determines which active regeneration component to use based on other operating conditions (e.g., battery levels, Noise/Vibration/Harshness (NVH), etc.). For example, if the heater 48 is an electric heater and the battery levels are low when the soot circuit 92 decides to initiate an active regeneration event, the soot circuit 92 does not issue a command to the heater 48.

The DEF deposit circuit 94 is structured or configured to determine an amount of DEF deposit accumulation in the aftertreatment system and to either initiate or defer a regeneration event based on an optimal control strategy. The DEF deposit circuit 94, based on data from the sensors indicative of a quantity of DEF deposit build-up throughout the aftertreatment system 70, determines that a regeneration event is required in order to recover performance of the aftertreatment system 70. This determination may be made if the data show an increase in regulated emissions (e.g., NOx) from the aftertreatment system 70, which indicates that the aftertreatment system 70 is treating the exhaust at less-than-standard levels due to DEF deposits throughout. Alternatively, this determination may be made if the data shows an increase in exhaust pressure in the aftertreatment system 70, which indicates that the flow of exhaust is impeded by DEF deposits. This determination may also be made if the data shows an unexpected or larger-than-normal amount of DEF dosing, which would increase the possibility of DEF deposits forming in the aftertreatment system. In another embodiment, the DEF deposit circuit 94 then, based on an analysis of the optimal control strategy from the remote computing system 35 that is correlated by the map circuit 90, determines if a passive regeneration event will occur within such a period of time than an active regeneration event is not required to maintain an acceptable level of performance from the aftertreatment system (i.e., the engine 12 will generate enough heat energy through normal operation to burn off the DEF deposits before aftertreatment system 70 is unable to properly treat the exhaust). As such, there may be two separate thresholds for analyzing the presence of DEF deposits: one that signals to the controller 26 that a regeneration event is required soon and one that indicates that a regeneration event is required immediately. In some embodiments, the second threshold is equivalent to the local emissions regulations. The first threshold acts as an indicator for the controller to begin comparing the current route information to the optimal control strategy. In this way, the first threshold reduces processing strain on the processor 52 by triggering the comparison at a particular time rather than having the comparison running in the background at all times. In some embodiments, the first threshold may be omitted.

If the DEF deposit circuit 94 determines that a passive regeneration event will occur within such a period of time that aftertreatment system 70 performance will not reach the second threshold (i.e., an amount of regulated emissions will not dip below what is required to meet emissions regulations), the DEF deposit circuit 94 either takes no action or cancels an active regeneration event that would have otherwise been scheduled. If the DEF deposit circuit 94 determines that such a passive regeneration event will not occur within the period of time, then the DEF deposit circuit 94 issues commands to various components of the vehicle 10 (e.g., the heater 48, the CDA system 44, etc.) to initiate an active regeneration event. The controller 26 determines which active regeneration component to use based on other operating conditions (e.g., battery levels, NVH, etc.). For example, if the vehicle 10 is currently in an area or operating at a time for which there are restrictions on engine noise when the DEF deposit circuit 94 decides to initiate an active regeneration event, the DEF deposit circuit 94 does not issue a command to the CDA system 44 in order to avoid the accompanying NVH.

The sulfur circuit 96 is structured or configured to determine an amount of sulfur poisoning in the aftertreatment system and to either initiate or defer a regeneration event based on stored data. The sulfur circuit 96, based on data from the sensors indicative of a quantity of sulfur poisoning throughout the aftertreatment system 70 and, particularly, the SCR system, determines that a regeneration event is required in order to recover performance of the SCR system. This determination may be made if the data show that an increase in regulated emissions (e.g., NOx) from the aftertreatment system 70, which would indicate that efficiency of the SCR catalyst has deteriorated. The sulfur circuit 96 then, based on an analysis of the optimal control strategy designed by the remote computing system 35 and correlated by the map circuit 90, determines if a passive regeneration event will occur within such a period of time than an active regeneration event is not required to maintain an acceptable level of performance from the SCR system (i.e., the engine 12 will generate enough heat energy through normal operation to burn off the sulfur before SCR system is unable to properly reduce the NOx in the exhaust). As such, there may be two separate thresholds for analyzing the presence of sulfur deposits: one that signals to the controller 26 that a regeneration event is required soon and one that indicates that a regeneration event is required immediately. In some embodiments, the second threshold is equivalent to the local emissions regulations. The first threshold acts as an indicator for the controller to begin comparing the current route information to the optimal control strategy. In this way, the first threshold reduces processing strain on the processor 52 by triggering the comparison at a particular time rather than having the comparison running in the background at all times. In some embodiments, the first threshold may be omitted.

If the sulfur circuit 96 determines that a passive regeneration event will occur within such a period of time that SCR catalyst efficiency will not reach the second threshold (i.e., SCR catalyst efficiency does not dip below what is required to meet emissions regulations), the sulfur circuit 96 either takes no action or cancels an active regeneration event that would have otherwise been scheduled. If the sulfur circuit 96 determines that such a passive regeneration event will not occur within the period of time, then the sulfur circuit 96 issues commands to various components of the vehicle 10 (e.g., the heater 48, the CDA system 44, etc.) to initiate an active regeneration event.

The ammonia circuit 98 is structured or configured to anticipate an amount of DEF dosing for the SCR 76 and to control an amount and timing of DEF dosing from the DEF doser 78 in response. The ammonia circuit 98, based on an analysis of the optimal control strategy designed by the remote computing system 35 and correlated by the map circuit 90, determines if there is an upcoming period of high ammonia desorption and reduces DEF dosing in response. The upcoming period of high ammonia desorption may be indicated by data showing that a temperature of the exhaust will reach a certain desorption threshold. For example, if the optimal control strategy indicates an upcoming hill, the ammonia circuit 98 determines that a period of high ammonia desorption is upcoming due to the ramp up in exhaust temperature associated with the increased load on the engine 12 from the vehicle 10 climbing a hill. In response to this determination, the ammonia circuit 98 reduces an amount of DEF dosing from the DEF doser 78 because DEF is already entering the exhaust stream due to desorption, so DEF dosing from the DEF doser on top of the desorbed DEF would be wasteful.

Figure 5:
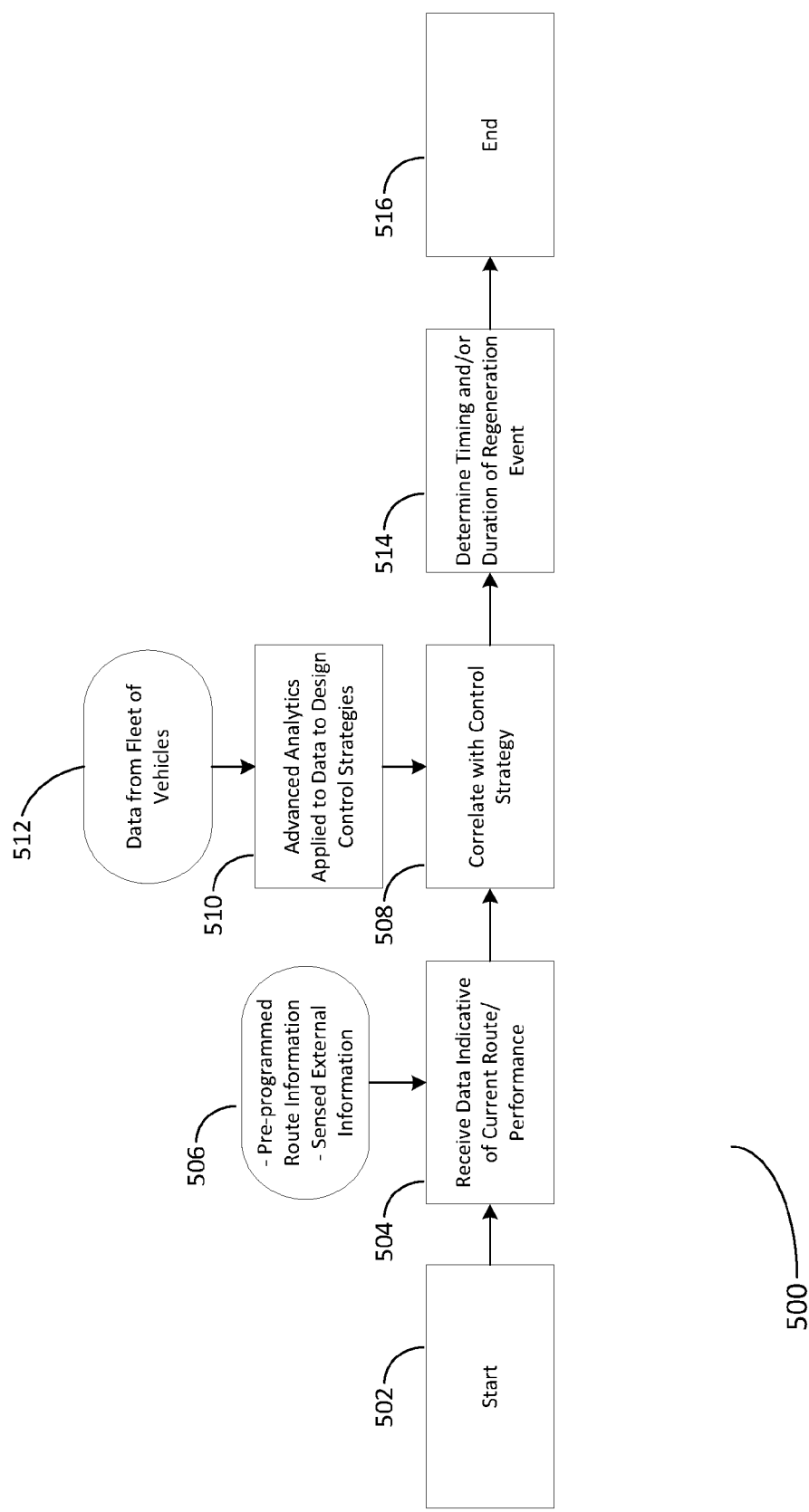
FIG. 5 is a flow diagram of a method for managing components of an aftertreatment system, according to an example embodiment.

According to FIG. 5, a method 500 for managing components of the aftertreatment system 70 is shown, according to an example. The method 500 may be performed, at least partly, by the controller 26 such that reference may be made to help explain method 500.

The method 500 begins at process 502 and proceeds to determine a current route of the vehicle 10 at step 504. This determination is made based on data received from step 506. After determining the current route, the current route is correlated with a control strategy at step 508. The control strategy is determined at step 510 based on advanced analysis of data received from a fleet 90 of vehicles at step 512. At step 514, a timing and/or duration of a regeneration event is determined based on the correlated control strategy. The method then ends at step 516.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIGS. 2, it should be understood that the controller 26 may include any number of circuits for completing the functions described herein. For example, the activities and functionalities of the map circuit 90, the soot circuit 92, the DEF deposit circuit 94, the sulfur circuit 96, and the ammonia circuit 98 may be combined in multiple circuits or as a single circuit. Additional circuits with additional functionality may also be included. Further, the controller 26 may further control other activity beyond the scope of the present disclosure.

As mentioned above and in one configuration, the "circuits" may be implemented in machine-readable medium for execution by various types of processors, such as the processor 52 of FIG. 3. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A system comprising:
   a heater associated with an aftertreatment system of a vehicle;
   a controller coupled to the heater and the aftertreatment system, the controller comprising at least one processor coupled to a memory storing instructions that, when executed by the at least one processor, causes the at least one processor to perform operations comprising:
   receive data indicative of at least one of a current route or of a current performance of the vehicle;
   correlate at least one of the current route or the current performance to a control strategy;
   determine at least one of a timing or a duration of an active regeneration event for the aftertreatment system based on the correlated control strategy; and
   activate the heater to raise a temperature of exhaust gas in the aftertreatment system to at least a target regeneration temperature, wherein the heater is activated according to at least one of the determined timing or the determined duration of the active regeneration event for the aftertreatment system.

2. The system of claim 1, wherein the control strategy is developed using an advanced analysis of data collected from a plurality of vehicles.

3. The system of claim 1, wherein the timing of the active regeneration event includes skipping a previously planned regeneration event based on the correlated control strategy.

4. The system of claim 1, wherein the active regeneration event is a regeneration event for a diesel particulate filter (DPF).

5. The system of claim 1, wherein the determination of at least one of the timing or the duration is further based on a feed-forward loop with the control strategy and data indicative of at least one of the current route or of the current performance.

6. The system of claim 1, the operations further comprising:
   determine a timing and amount of diesel exhaust fluid (DEF) usage based on the correlated control strategy,
   wherein the correlated control strategy comprises information regarding at least one of a temperature of a selective catalytic reduction (SCR) system, ammonia storage, or ammonia-to-NOx ratio (ANR).

7. The system of claim 1, the operations further comprising:
   minimize at least one of an amount of system-out NOx or an amount of ammonia slip based on the correlated control strategy,
   wherein the correlated control strategy comprises information regarding at least one of a temperature of a selective catalytic reduction (SCR) system, ammonia storage, or ammonia-to-NOx ratio (ANR).

8. The system of claim 1, the operations further comprising:
   activate a cylinder-deactivation (CDA) system based on the correlated control strategy.

9. The system of claim 1, wherein the determination is further based on current weather conditions.

10. The system of claim 1, wherein the controller is in substantially continuous communication with a remote computing system via a network, and
    wherein the correlation to the control strategy is done over the network.

11. A method for managing components of an aftertreatment system, the method comprising:
    receiving, by a controller, data indicative of at least one of a current route or of a current performance of a vehicle;
    correlating, by the controller, at least one of the current route or the current performance to a control strategy;
    determining, by the controller, at least one of a timing or a duration of an active regeneration event for an aftertreatment system based on the correlated control strategy; and
    activating, by the controller, a heater to raise a temperature of exhaust gas in the aftertreatment system to at least a target regeneration temperature, wherein the heater is activated according to at least one of the determined timing or the determined duration of the active regeneration event for the aftertreatment system.

12. The method of claim 11, wherein the control strategy is developed using an advanced analysis of data collected from a plurality of vehicles.

13. The method of claim 11, wherein the timing of the active regeneration event includes skipping a previously planned regeneration event based on the correlated control strategy.

14. The method of claim 11, wherein the determination of at least one of the timing or the duration is further based on a feed-forward loop with the control strategy and data indicative of at least one of the current route or of the current performance.

15. The method of claim 11, further comprising:
    determining a timing and amount of diesel exhaust fluid (DEF) usage based on the correlated control strategy,
    wherein the correlated control strategy comprises information regarding at least one of a temperature of a selective catalytic reduction (SCR) system or an ammonia-to-NOx ratio (ANR).

16. The method of claim 11, further comprising:
    minimizing, by the controller, at least one of an amount of system-out NOx or an amount of ammonia slip based on the correlated control strategy,
    wherein the correlated control strategy comprises information regarding at least one of a temperature of a selective catalytic reduction (SCR) system, ammonia storage, or ammonia-to-NOx ratio (ANR).

17. The method of claim 11, further comprising:
    activating, by the controller, a heater of a cylinder-deactivation (CDA) system to deactivate at least one cylinder of the vehicle thereby raising the temperature of the exhaust gas in the aftertreatment system.

18. A system comprising:
    a heater associated with an aftertreatment system of a vehicle;
    a controller coupled to the heater and the aftertreatment system, the controller comprising at least one processor coupled to a memory storing instructions that, when executed by the at least one processor, cause the at least one processor to perform operations comprising:
      receive data indicative of at least one of a current route or of a current performance of a vehicle, the data providing an indication of a passive regeneration event for the aftertreatment system;
      interpret at least one of a timing or of a duration of the passive regeneration event based on the data;
      correlate at least one of the current route or the current performance to a control strategy; and
      activate the heater to raise a temperature of exhaust gas in the aftertreatment system to at least a target regeneration temperature, thereby altering at least one of the timing or the duration of the passive regeneration event for the aftertreatment system based on the correlated control strategy.

19. The system of claim 18, wherein the heater is activated to at least one of increase a temperature of the exhaust gas to at least the target regeneration temperature or sustain the exhaust gas at least at the target regeneration temperature for a longer duration relative to an occurrence of the passive regeneration event by itself.

20. The system of claim 18, wherein the heater is activated before an end of the passive regeneration event to maintain an elevated exhaust gas temperature.

* * * * *